UNITED STATES PATENT OFFICE.

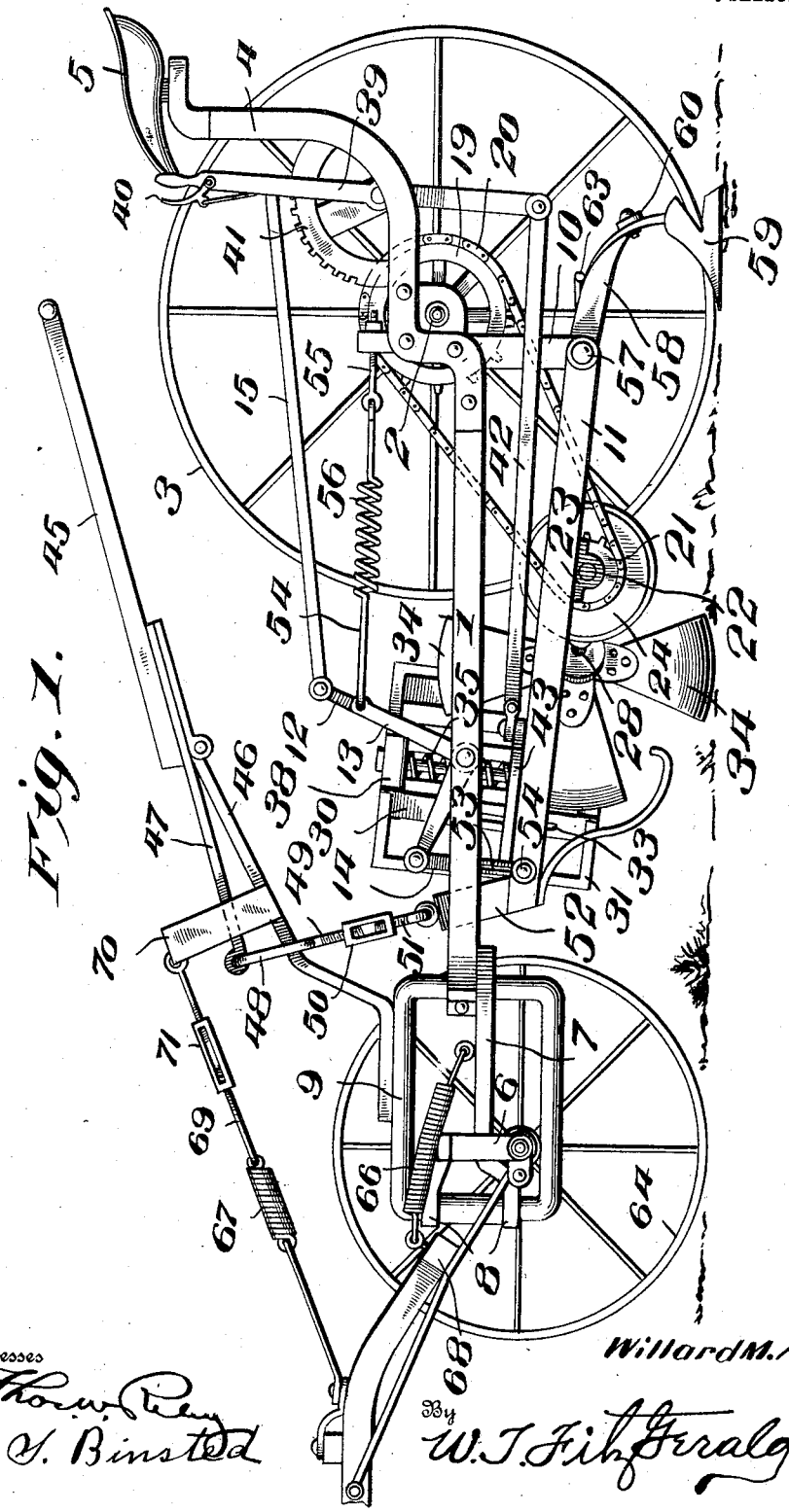

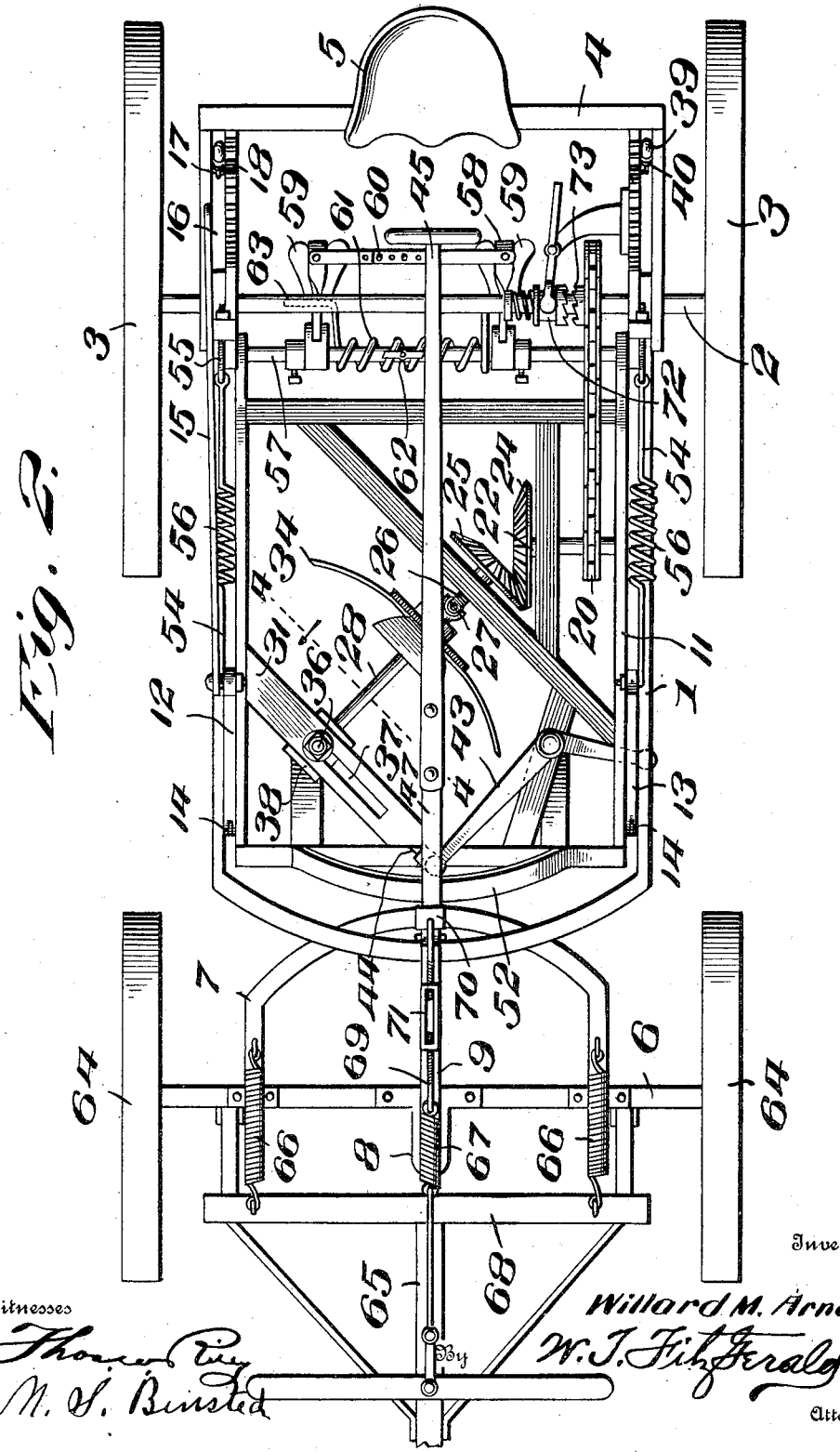

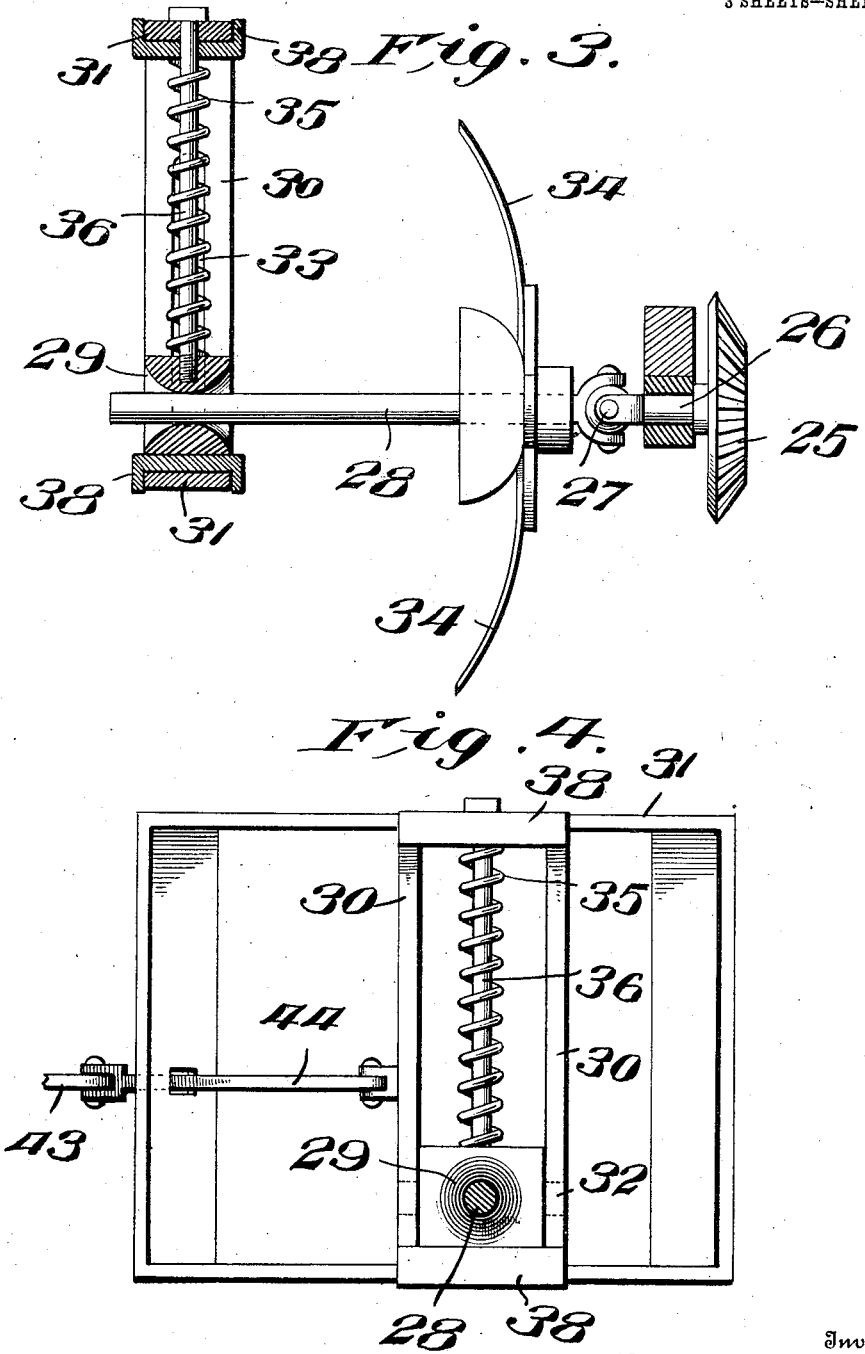

WILLARD M. ARNOLD, OF DALLAS, TEXAS.

COMBINED COTTON CHOPPER AND CULTIVATOR.

No. 861,569.  Specification of Letters Patent.  Patented July 30, 1907.

Application filed December 22, 1906. Serial No. 349,097.

*To all whom it may concern:*

Be it known that I, WILLARD M. ARNOLD, a citizen of the United States, residing at Dallas, in the county of Dallas and State of Texas, have invented certain new and useful Improvements in a Combined Cotton Chopper and Cultivator; and I do hereby declare the following to be a full, clear, and exact description of the invention, such as will enable others skilled in the art to which it appertains to make and use the same.

My invention relates to new and useful improvements in combined cotton choppers and cultivators and my object is to provide means for guiding the chopping mechanism independently of the draft animals, whereby the chopping disk may be held into engagement with the row of plants or entirely removed to one side thereof.

A further object is to provide means for raising and lowering the chopping disk.

A still further object is to provide yielding means for the shaft carrying the chopping disk whereby when said disk encounters a solid substance it may automatically raise and pass over the obstruction and a still further object is to provide means for shifting the chopping disk laterally whereby the chopping capacity of the disk will be increased or decreased.

Other objects and advantages will be hereinafter referred to and more particularly pointed out in the claims.

In the accompanying drawings which are made a part of this application. Figure 1 is a side elevation of my improved cotton chopper showing the near wheels removed therefrom. Fig. 2 is a top plan view of the chopper. Fig. 3 is a detail side elevation, partly in section, of the chopping disk and supporting means therefor, and Fig. 4 is a detail sectional view as seen from line 4—4 Fig. 2.

Referring to the drawings in which similar reference numerals designate corresponding parts throughout the several views 1 indicates the main frame of my improved chopper which is mounted at its rear end upon an axle 2 said axle having carrying wheels 3 at each end thereof. That portion of the frame 1 in the rear of the axle 2 is directed upwardly to form a platform 4 upon which is mounted the usual or any preferred form of seat 5. The forward end of the frame 1 is supported upon an auxiliary truck said truck comprising an axle 6 extending rearwardly from which is a guide or fifth wheel 7 upon which the forward end of the frame rests. Extending forwardly from the axle 6 and at the central portion thereof are brackets 8 in which is pivotally mounted a link 9 said link surrounding the axle and extending to a point adjacent the guide 7 to receive the forward end of the frame 1, said frame being pivotally secured to the link.

Secured to the frame 1 at a point adjacent to the rear axle are standards 10 to the lower ends of which is pivotally secured the rear end of an auxiliary frame 11, the forward end of said auxiliary frame being adjustably secured to the main frame 1 through the medium of bell crank levers 12 and 13 which are pivotally secured to the frame 1 and are connected to the forward end of the frame 11 by means of straps 14.

Secured to the upper end of the bell crank lever 12 is a rod 15 which is in turn pivotally secured to an operating lever 16 said lever being provided with the usual form of controlling latch 17 which coöperates with a rack bar 18 carried by the frame 1 so that by operating said lever forwardly or rearwardly the auxiliary frame may be lowered or raised at will, and held in its adjusted position.

Mounted upon the axle 2 is a sprocket wheel 19 around which is disposed a sprocket chain 20 the opposite end of said chain being directed around an auxiliary sprocket wheel 21 which is rigidly mounted upon a shaft 22 said shaft being held upon the auxiliary frame 11 by means of bearings 23. The inner end of the shaft 22 is provided with a bevel gear 24 which is adapted to mesh with a similar gear 25 carried by a stub shaft 26 said shaft and bevel gear being disposed at an angle to the shaft 22 and gear 24 and is secured at its inner end by means of a toggle joint 27 to a driving shaft 28, the free end of said shaft being in turn rotatably mounted in a bearing 29 which is disposed between suitable guides 30 carried by a supporting frame 31.

The bearing 29 is vertically movable within the guides 30 and is provided at opposite sides with trunnions 32 which extend through vertically disposed slots 33 in the guides 30 so that when the chopping disk 34 carried by the driving shaft 28 encounters a solid substance the bearing 29 will move upwardly thereby allowing the disk to pass over the solid substance without injuring the same and in order to normally hold the bearing at the lower end of the guide 30 so that shaft 28 will rest in a horizontal plane I provide a spring 35 which is disposed between the bearing 29 and the upper end of the guides 30 and is disposed around a bolt 36 which extends through an elongated slot 37 in the frame 31 and has its lower end seated in a socket in the bearing 29 thereby holding the spring securely in place between the upper end of the guide and the bearing 29. The upper and lower ends of the guide 30 are provided with flanges 38 said flanges engaging the edges of the horizontal sections of the supporting frame 31 thereby securely holding the guide upon the frame and providing a sliding bearing therefor.

In order to readily adjust the path of the chopping disk 34 so that the cutting capacity thereof may be increased or decreased without effecting or changing the general course of the draft animals I have provided means for moving the guides 30 longitudinally of the frame 31 said means consisting of a controlling lever 39 which is pivotally secured to the frame 1 at a point in the rear of the rear axle 2, the upper end of said lever being provided with a latch 40 which is adapted to cooperate with a rack bar 41 to hold said lever in its adjusted position. Pivotally secured at one end to the lower end of the controlling lever 39 is a bar 42 the opposite end of said bar being pivotally and yieldingly secured to one arm of a bell crank lever 43 which is in turn pivotally mounted upon the frame 1. Secured to the opposite arm of the lever 43 is a pitman 44 which extends through one wall of the frame 31 and is pivotally secured to the guide 30 so that when the controlling lever is moved forwardly and rearwardly the guides will be shifted longitudinally of the frame 31 and the capacity of the chopping disk decreased or increased.

It has been found in practice that the draft animals frequently swerve from side to side and thereby move the chopping disk out of the line of the row of plants and in order to retain the chopping disk in line with the plants even when the draft animals direct the chopper to one side of the row, I have provided a guiding lever 45 which is pivotally secured to one end of an arm 46 which is in turn rigidly secured to the horizontal portion of the link 9 so that by shifting the lever 45 to the right or left the forward end of the main frame and parts carried thereby will likewise be directed to the right or left, which will result in moving the chopping disk so as to retain the same in line with the row of plants even when the guiding truck is considerably out of line therewith. Lever 45 is pivoted to 46 by a horizontal pivot and is rigid with 46 so far as lateral movement is concerned.

Secured to, and extending forwardly from the guiding lever 43 is a lifting arm 47 the free end of which is secured to a loop 48 said loop extending around the arm 46 and terminating in a bolt 49 to the threaded end of which is secured a turn-buckle 50 the opposite end of said turn-buckle receiving the threaded end of an eyebolt 51 which is in turn secured in any preferred manner to the arched section 52 of the auxiliary frame 11 so that by raising or lowering the free end of the guiding lever 45 the forward end of the auxiliary frame may be readily lowered or raised, thereby providing means for quickly regulating the depth of the chopping disk 34.

In order to allow the auxiliary frame 11 to move freely without operating the lever 16 I have provided the straps 14 with slots 52 so that the bolt 54 employed in securing the straps to the auxiliary frame 11 may be readily moved upwardly or downwardly in said slots when the guiding lever 45 is operated to raise or lower the auxiliary frame 11.

In order to relieve the rod 15 and operating lever 16 from the weight of the auxiliary frame 11 and at the same time assist the operator in raising the auxiliary frame without employing an undue amount of labor I have provided rods 54, one for each side of the frame 1, one end of which is secured to the bell crank levers 12 and 13 while the opposite ends thereof are pivotally secured to the upwardly extending ends of the standards 10 by means of eyebolts 55 each of said rods being provided with spring sections 56 which are adapted to exert a tension upon the levers 12 and 13 at all times so that when it is desired to raise the auxiliary frame 11 the tension of said springs will lessen the weight upon the operating lever 16 to such an extent that the auxiliary frame may be raised by applying a slight pull upon the operating lever.

The shaft 57 which extends through the lower ends of the standards 10 and forms the bearing for the auxiliary frame 11 is also provided with rearwardly extending shanks 58 to the lower ends of which are secured cultivating plows 59 the shanks 58 being pivotally mounted upon the shaft 57 and secured together by means of spacing bars 60 the meeting ends of said bars being adjustably secured together so that the plows may be set a suitable distance apart and retained in their adjusted position.

The shanks 58 are yieldingly mounted upon the shaft 57 so that when the plows engage a solid substance, such as a rock or the like said plows may be moved upwardly and pass over the obstruction and the plows are held into engagement with the soil by means of a coiled spring 61 which is disposed around the shaft 57 and secured thereto by means of a clip 62 the free ends of said spring terminating in angular extensions 63 which are disposed above the shanks 58 and direct downward pressure thereon so that as soon as the plows are free of the obstructions the spring 61 will immediately direct the same into engagement with the soil.

The forward axle 2 is provided at each end with wheels 64 and also has pivotally secured thereto and extending forwardly therefrom a tongue 65 and said tongue is normally supported in a horizontal position by means of tension springs 66 and a spring 67, the springs 66 being secured at one end to the guide 7 and extending over the axle 6 and into engagement with the cross bar 68 of the tongue while the spring 67 is carried by a brace rod 69 one section of the rod being secured to a bracket 70 on the arm 46 and the opposite end to a convenient point upon the tongue 65 the brace rod being formed in sections and connected together by a turn-buckle 71 so that the tension upon the spring 67 may be increased or decreased thereby raising or lowering the plane of the tongue.

In operation the chopping mechanism is hitched to the driving axle 2 by disposing a clutch 72 into engagement with a clutch face 73 on the sprocket wheel 19 thereby imparting rotary motion to the chopping disk 34 after which the operating lever 16 is moved forwardly and the auxiliary frame 11 lowered thereby directing the chopping disk into engagement with the growing plants and should it be found that the chopping disk was out of line with the row of plants the forward ends of the frames 1 and 11 may be quickly moved to the right or left by swinging the rear end of the guiding lever 45 to the right or left thereby retaining the chopping disk in line with the plants until such time as the course of the draft animals may change sufficiently to cause the cutting disk to travel in the row. The shaft 28 carrying the cutting disk 34 is disposed diagonally in the auxiliary frame 11 so that the stroke of the disk will be quartering to the row of plants and the cutting capacity of the disk, which is preferably formed in sections as shown, may be readily increased or decreased by shifting the guides 30 on the frame 31, said operation being accomplished through the medium of the lever 39, bar 42, bell crank lever 43 and pitman 44.

What I claim is:—

1. In a device of the class described the combination, with a main frame and means to support the rear end thereof, of an axle at the forward end of said frame, a guide on said axle upon which the forward end of said frame is adapted to rest, a link pivotally secured at one end to said frame and at its opposite end to said axle and means secured to said link whereby said link may be moved laterally to guide said frame.

2. In a device of the class described the combination, with a main frame and supporting means for the rear end thereof, of an auxiliary frame pivotally secured to said main frame, an axle at the forward end of said main frame, a link pivotally secured at one end to axle and at its opposite end to said main frame, an arm fixedly secured to said link, a guiding lever pivotally secured to said arm and means disposed between said lever and auxiliary frame to raise said auxiliary frame when said lever is depressed.

3. In a device of the class described the combination, with a main frame and supporting means therefor, of an auxiliary frame one end of which is pivotally secured to said main frame, a disk in said auxiliary frame, a driving shaft for said disk, a movable bearing for the outer end of said shaft, guides for said bearing, a supporting frame for said guides, a bolt disposed through an elongated slot in said supporting frame and having its lower end seated in said bearing, a spring disposed around said bolt and between the upper end of said guide and the bearing whereby said shaft will be normally held in a horizontal position and means to move said guide laterally in said supporting frame whereby the cutting capacity of the disk will be increased or decreased.

4. In a device of the class described the combination, with a main frame and supporting means therefor, of an auxiliary frame pivotally secured at one end to said main frame and below the same, a disk carried by said auxiliary frame, bell crank levers pivotally secured to said main frame, slotted links disposed between said bell crank levers and the auxiliary frame, a rod secured to one of said bell crank levers, an operating lever at the opposite end of said rod, spring actuated rods secured at one end to said levers and at their opposite end to said main frame whereby a portion of the weight of said auxiliary frame will be removed from the operating lever.

5. In a device of the class described the combination, with a main frame and supporting means therefor, of an auxiliary frame pivotally secured at one end to said main frame, bell crank levers pivotally secured to said main frame, depending straps on one arm of each of said bell crank levers and having their opposite ends secured to the free end of said auxiliary frame said straps having elongated slots therein, bolts adapted to extend through said slots and movably secure the auxiliary frame to the straps, a rod secured to the opposite arm of one of said bell crank levers, an operating lever for said rod adapted to raise and lower said auxiliary frame and means at the forward end of said auxiliary frame to raise the same independently of the operating lever.

6. The combination with a main frame, of an auxiliary frame pivotally secured thereto, means to raise and lower the forward end of said auxiliary frame, a driving shaft having a chopping disk mounted thereon, a toggle joint at one end of said shaft, a stub shaft carried by said auxiliary frame and secured to said toggle joint, a vertically movable bearing for the opposite end of said driving shaft, guides for said bearing, trunnions on said bearing adapted to extend through slots in said guides, a frame for said guides, flanges on said guides adapted to engage said frame, a spring disposed between said bearing and upper end of said guides, means to retain said spring between said bearing and guides and additional means to move said guides laterally on said frame whereby the cutting capacity of said disk will be increased or decreased, and means to rotate said driving shaft.

7. In a device of the class described the combination, with a main frame and carrying means therefor, of an axle at the forward end of said main frame, a link pivotally secured at one end to said axle and at its opposite end to said main frame, an arm fixedly secured to said link, a guiding lever pivotally secured to the outer end of said arm whereby said link may be moved to the right or left and the main frame guided independently of said axle, a lifting arm on said lever and means disposed between said lifting arm and auxiliary frame whereby when said lever is depressed the forward end of said auxiliary frame will be elevated.

In testimony whereof I have signed my name to this specification in the presence of two subscribing witnesses.

WILLARD M. ARNOLD.

Witnesses:
J. M. AVERY,
CLOYD H. READ.